US008818197B2

(12) United States Patent
Jenson

(10) Patent No.: US 8,818,197 B2
(45) Date of Patent: Aug. 26, 2014

(54) METHODS AND SYSTEMS FOR HIGH BANDWIDTH OPTICAL COMMUNICATION

(75) Inventor: Barton J. Jenson, Everett, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 104 days.

(21) Appl. No.: 13/284,200

(22) Filed: Oct. 28, 2011

(65) Prior Publication Data

US 2012/0106978 A1  May 3, 2012

Related U.S. Application Data

(60) Provisional application No. 61/408,502, filed on Oct. 29, 2010.

(51) Int. Cl.
*H04B 10/00* (2013.01)

(52) U.S. Cl.
USPC ........... 398/129; 398/135; 398/137; 398/128; 398/118; 372/38.06

(58) Field of Classification Search
None
See application file for complete search history.

(56) References Cited

U.S. PATENT DOCUMENTS

| | | | |
|---|---|---|---|
| 6,043,920 A | | 3/2000 | Leopold et al. |
| 2003/0090765 A1* | | 5/2003 | Neff et al. ..................... 359/172 |
| 2004/0022537 A1 | | 2/2004 | Mecherle et al. |
| 2007/0031150 A1 | | 2/2007 | Fisher et al. |
| 2008/0285118 A1* | 11/2008 | Nati et al. .................. 359/341.3 |
| 2008/0285977 A1* | 11/2008 | Caplan .......................... 398/130 |
| 2009/0041477 A1* | 2/2009 | Alwan et al. ................. 398/202 |
| 2009/0046746 A1* | 2/2009 | Munroe et al. .................... 372/6 |
| 2010/0172381 A1* | 7/2010 | Jameson ........................... 372/9 |

OTHER PUBLICATIONS

Judith B. Snow ; James P. Flatley ; Dennis E. Freeman ; Mark A. Landry; Carl E. Lindstrom ; Jacob R. Longacre ; Joshua A. Schwartz; Underwater propagation of high-data-rate laser communications pulses. Proc. SPIE 1750, Ocean Optics XI, 419 (Dec. 31, 1992).*
International Search Report for international application No. PCT/US2011/058343, dated Feb. 16, 2012 (10 pages).
Written Opinion of the International Searching Authority for international application No. PCT/US2011/058343, dated Feb. 16, 2012 (7 pages).

* cited by examiner

*Primary Examiner* — Ken Vanderpuye
*Assistant Examiner* — Merlin Brito Peguero
(74) *Attorney, Agent, or Firm* — Hamre, Schumann, Mueller & Larson, P.C.

(57) ABSTRACT

Methods and systems are provided for extending the range that a laser can transmit data, particularly in environments with high attenuation or turbidity. Particularly, an energy storing laser that is capable of continuously converting electrical energy to optical energy and storing the optical energy or the electrical energy in the energy storing laser until the energy storing laser is instructed to transmit a laser transmission. In some embodiments, the energy storing laser uses a pulse train with a low duty cycle to increase the peak power of each laser pulse. Also, a pointing and tracking system is used to provide a communication link between stationary platforms or moving vehicles.

19 Claims, 5 Drawing Sheets

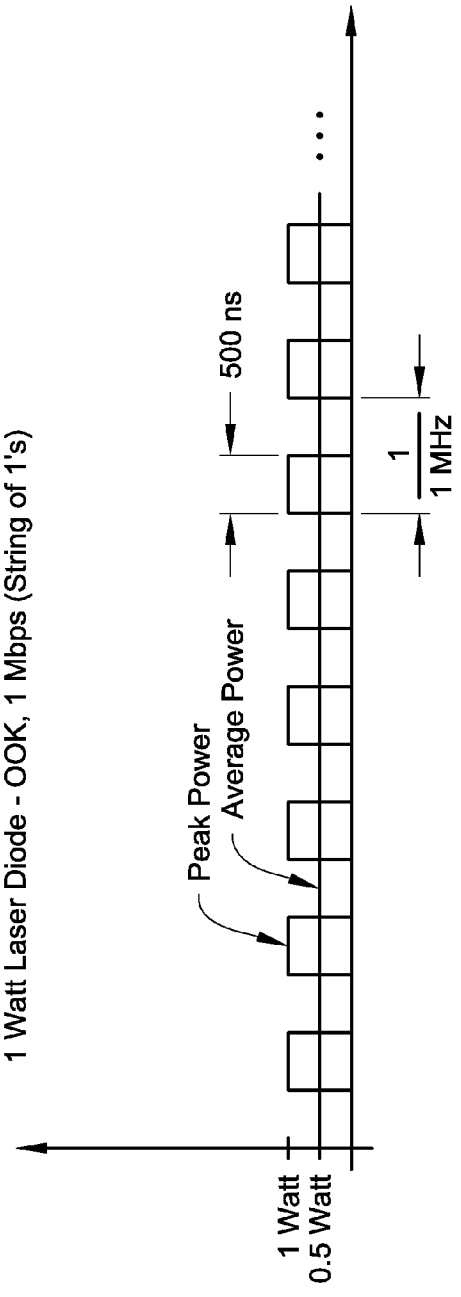
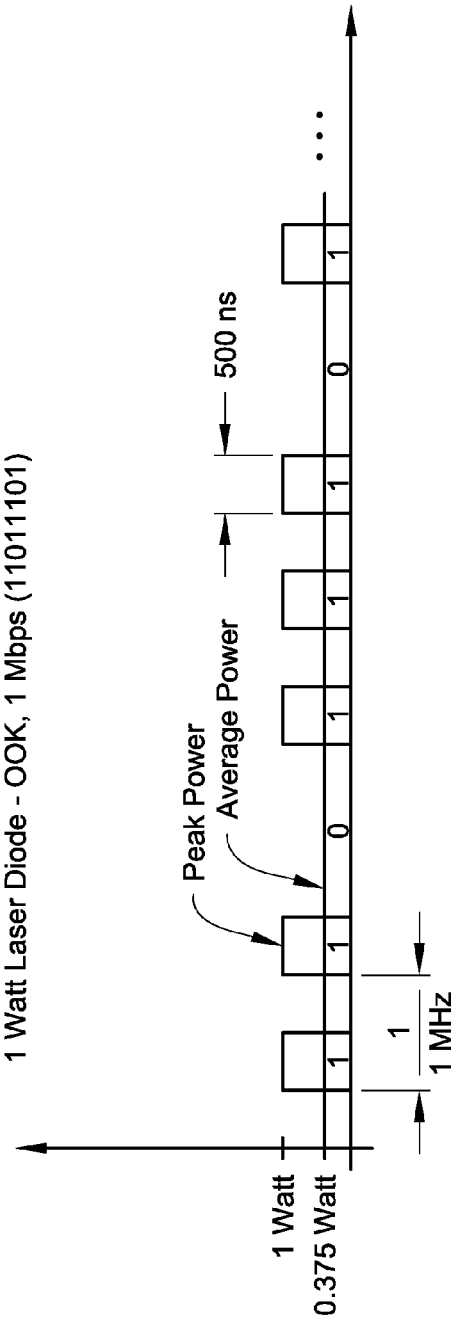

METHODS AND SYSTEMS FOR HIGH BANDWIDTH OPTICAL COMMUNICATION

This application claims the benefit of priority of U.S. Provisional Application No. 61/408,502, filed on Oct. 29, 2010, and entitled METHODS AND SYSTEMS FOR HIGH BANDWIDTH OPTICAL COMMUNICATION, and which is herewith incorporated by reference in its entirety.

FIELD

This disclosure relates to the field of optical communication technology. More particularly, this description relates to methods and systems for high bandwidth optical communication.

BACKGROUND

Free space optical (FSO) communication systems enable higher bandwidth data transmission over conventional radio frequency (RF) systems that are employed in air or space. The limit to transmission range in these systems is on the order of several kilometers or less depending upon receiver sensitivity and laser transmitter power. In air or space a trade is made between the superior range of RF communication systems and the superior bandwidth of optical communication systems. There is a need to extend the range of FSO communication systems in order to take advantage of superior bandwidth at ranges approaching or exceeding that of RF communication systems.

Similarly, undersea data transmission and communication systems severely lack the bandwidth or range needed for numerous applications that are considered trivial in open air or space. For example, undersea acoustic communication systems are limited in data transmission rates to tens of kilobits per second and are plagued with high latency at modest ranges due to limits imposed by the speed of sound, Doppler shift from relative motion of transceivers, multi-path interference, etc. On the other hand, undersea radio frequency or electro-magnetic communication systems, which provide faster transmission rates, are limited to distances of less than approximately 10 m due to the rapid attenuation in electrically conductive sea water.

Optical communication technology can be used to increase the bandwidth for undersea communication systems. However, extremely high power lasers, on the order of several kilo-Watts, are required to overcome the rapid attenuation of light and the turbidity of the water in an undersea environment. This is true even for green and blue wavelengths, which experience the best transmission characteristics in any given undersea environment. Notwithstanding the technical challenges of producing this much laser power, the power supplies required to run these lasers become too large in size, weight, and power for practical deployment in many undersea vehicles. There is a need to extend the range of undersea optical (USO) communication systems in order to take advantage of their superior bandwidth at ranges approaching or exceeding that of acoustic communication systems, without consuming more power and without taking up more space.

Another problem of using optical communication technology is that it becomes difficult to maintain optical communication links between two moving undersea vehicles. Optical communication systems typically employ low divergence lasers with small spot sizes in order to concentrate as much signal on the receiver as possible. Tracking and adjustment of the pointing angle of the laser is required to compensate for relative motion and orientation between two undersea vehicles, or between an undersea vehicle and surface vehicle, which experiences additional motion due to waves.

SUMMARY

This application describes methods and systems for increasing the range of high bandwidth optical communication systems. While the embodiments described herein are discussed with respect to undersea laser communication applications, these embodiments can also be applied in free space laser communication applications, space laser communication applications and atmospheric laser communication applications.

The embodiments described herein are capable of supporting megabits per second data rates or higher. Also, the embodiments described herein can provide communication links between stationary platforms or moving vehicles that are greater than 300 meters in clear, or deep-ocean, environments, upwards of 100 meters in typical undersea environments, and upwards of 50 meters in the most turbid undersea environments.

Also, the embodiments described herein can provide data transmission speeds that are 100 times greater than data transmission speeds using acoustic systems.

Also, in contrast to conventional optical communication approaches that use off the shelf laser technology and standard data modulation schemes that necessitate large amounts of energy use, the embodiments described herein can be provided in a smaller package with reduced power requirements.

These embodiments described herein provide high bandwidth optical communication that takes up less space than extremely high powered lasers, is robust and is power efficient. This opens up a host of applications in the undersea environment that require data transmission and communication between autonomous undersea vehicles, submarines and surface vehicles.

The embodiments described herein provide an energy storing architecture that includes an energy storing laser designed to be modulated with a low duty factor pulse train and capable of storing optical energy. The peak power of the energy storing architecture is increased by reducing the duty factor of the pulse train, which is encoded with data. That is, reducing the pulse width increases the peak power without requiring an increase in the average power consumed by the energy storing laser. In some embodiments, the energy storing architecture includes a low power pulsed laser and an optical amplifier that stores optical energy between pulses. In some embodiments a gain medium is used to store the optical energy between pulses.

Also, in some embodiments, energy can be stored electrically and transmitted using a low duty factor pulse modulation. For example, an energy storing laser that can be driven at a very high current while delivering high optical output peak power can be used. In these embodiments, the laser peak power may not be a limiting factor. That is, a power supply capable delivering a plurality of pulses each of which having a pulse width that is less than half a time period between adjacent pulses can result in short bursts of high energy pulses that are directly converted to high electrical optical pulses without increasing average power consumption. Thus, the peak power of each pulse can be high (e.g. one or more orders of magnitude larger than the average power of the laser pulses) without significantly increasing the average power.

The embodiments described herein provide a pointing and tracking system between the laser of a transmitting station and the receiving unit of a receiving station. The transmitting station and the receiving station can be, for example, a stationary platform, a moving vehicle, etc.

In one embodiment, a method for high bandwidth optical communication is provided. The method includes establishing a communication link between a laser transmitter and a receiving unit. The laser transmitter includes an energy storing architecture. The method also includes converting data to be transmitted by the laser transmitter into a communication signal. Also, the method includes incorporating the communication signal into a laser transmission that includes a plurality of laser pulses. Each of the laser pulses has a pulse width less than half a time period between adjacent laser pulses of the laser transmission. Further, the method includes transmitting the laser transmission. Moreover, the method includes the energy storing architecture converting electrical energy into optical energy and storing the optical energy or the electrical energy generated between a transmission of adjacent laser pulses of the laser transmission.

In another embodiment, a system for high bandwidth optical communication is provided. The system includes an optical communication device. The optical communication device includes a transmit drive electronics component configured to convert data to be sent from the optical communication device into a communication signal. The optical communication device also includes a laser transmitter configured to transmit a laser transmission. The laser transmission includes a plurality of laser pulses and incorporates the communication signal. The laser transmitter includes an energy storing architecture configured to convert electrical energy into optical energy and is configured to store the optical energy or the electrical energy generated between a transmission of adjacent laser pulses of the laser transmission. Also, each of the plurality of laser pulses is configured to have a pulse width that is less than half a time period between adjacent laser pulses of the laser transmission.

In yet another embodiment, an optical communication device for high bandwidth optical communication is provided. The optical communication device includes a transmit drive electronics component that is configured to convert data to be sent from the optical communication device into a communication signal. The optical communication device also includes a laser transmitter configured to transmit a laser transmission. The laser transmission includes a plurality of laser pulses and incorporates the communication signal. The laser transmitter includes an energy storing architecture configured to convert electrical energy into optical energy and is configured to store the optical energy or the electrical energy generated between a transmission of adjacent laser pulses of the laser transmission. Also, each of the laser pulses is configured to have a pulse width that is less than half a time period between adjacent laser pulses of the laser transmission.

DESCRIPTION OF THE DRAWINGS

FIGS. 1A-1C are waveform diagrams of a one Watt laser diode transmitting a communication signal using On/Off Key modulation.

DETAILED DESCRIPTION

In the following detailed description, reference is made to the accompanying drawings that form a part hereof, and in which is shown by way of illustration specific embodiments in which the invention may be practiced. These embodiments are described in sufficient detail to enable those skilled in the art to practice what is claimed, and it is to be understood that other embodiments may be utilized without departing from the spirit and scope of the claims. The following detailed description is, therefore, not to be taken in a limiting sense.

The embodiments described herein are discussed with respect to undersea laser communication applications. However, these embodiments can also be applied in free space laser communication applications, space laser communication applications and atmospheric laser communication applications.

In the undersea environment, the embodiments described herein are capable of supporting megabits per second data rates or higher. Also, the embodiments described herein can provide communication links between stationary platforms or moving vehicles that are separated by greater than 300 meters in clear, or deep ocean, environments, upwards of 100 meters in typical undersea environments, and upwards of 50 meters in the most turbid undersea environments.

Also, the embodiments described herein can provide data transmission speeds that are 100 times greater than data transmission speeds using acoustic systems.

Also, in contrast to conventional optical communication approaches that would be required to use large lasers or a large array of combined off the shelf laser technologies in order to achieve significant improvements in range, the embodiments described herein can be provided in a smaller package with reduced power requirements.

Thus, the embodiments described herein provide extended range, high bandwidth optical communication systems that take up less space than extremely high powered lasers, are robust and are power efficient. This opens up a host of applications in the undersea environment that require data transmission and communication between autonomous undersea vehicles, submarines and surface vehicles.

Figure 1C:
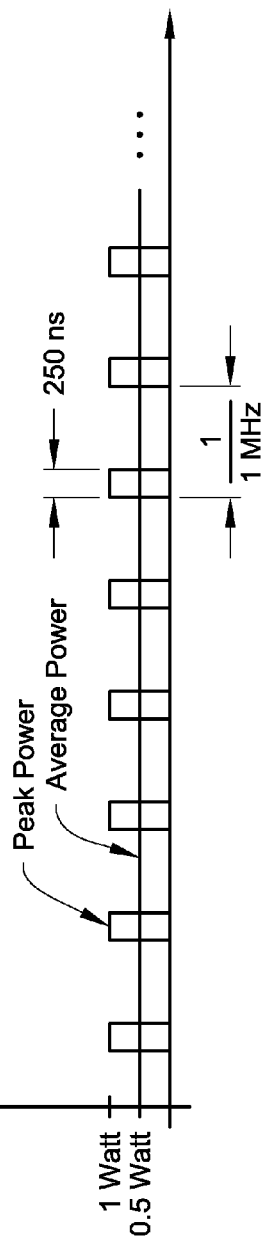

In conventional optical communication systems, a laser diode is modulated with an approximate square wave pulse train. FIGS. 1A-1C are waveform diagrams of a one Watt laser diode transmitting a communication signal using On/Off Key ("OOK") modulation.

For example, In FIGS. 1A and 1B the pulse train is set at a 1 MHz frequency between pulses to send data at a rate of 1 Mbps with a 50% duty cycle. Thus, in FIGS. 1A and 1B the "on" period for each pulse cycle is 500 ns and the "off" period for each pulse cycle is also set to 500 ns. FIG. 1A shows a data transmission of a string of 1's (i.e. 11111111). In this example, the peak power of the one Watt laser diode is one Watt and the average power transmitted by the one Watt laser diode for this data transmission is 0.5 Watts. FIG. 1B shows a data transmission with a mixture of binary '1's and '0's (i.e. 11011101). In this example, the peak power of the one Watt laser diode remains one Watt but the average power consumed by the one Watt laser diode for this data transmission is now 0.375 Watts as the laser diode remains "off" each time a 0 bit is transmitted.

In FIG. 1C, the pulse train remains set at a 1 MHz frequency between pulses to send data at a rate of 1 Mbps, but the pulse train now uses a 25% duty cycle. Thus, the "on" period for each pulse cycle is 250 ns and the "off" period for each pulse cycle is set to 750 ns. FIG. 1C shows a data transmission of a string of binary '1's (i.e. 1111111). In this example, the peak power of the one Watt laser diode is one Watt and the average power transmitted by the one Watt laser diode for this data transmission is 0.25 Watts. The peak power does not increase, and the 1 Watt of laser power available is not fully utilized.

Figure 2:
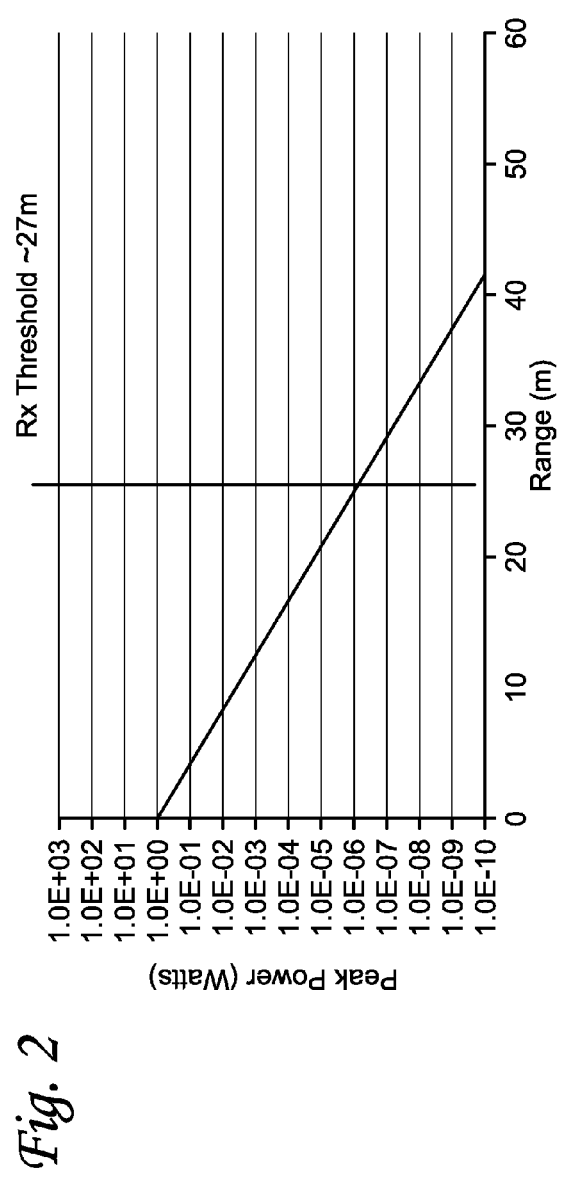
FIG. 2 is a graph showing a laser transmitter's peak power without an optical energy storing mechanism, employing a 1 Watt blue laser diode, as it is attenuated over range in a turbid undersea environment and the corresponding maximum range that can be received by a typical receiver station.

Conventional laser diode architectures exhibit very limited energy storage capability due to a very short (e.g. less than 1 ns) upper state lifetime. As a result, the generated optical beam essentially follows the applied voltage and current. As soon as a voltage and current is applied to the laser diode an optical beam is transmitted, and as soon as the voltage and current is removed from the laser diode, the optical beam can no longer be transmitted. Therefore, the peak power of a transmitted pulse from a laser diode architecture is limited by the maximum forward voltage of the laser diode. Accordingly, as shown in FIG. 1C, the peak power of each pulse cannot be increased even if the duty cycle for transmitting the data signal is reduced. Thus, regardless of the pulse width for the transmitting data, the data transmission can only be transmitted the same distance. In one example, as shown in FIG. 2, the maximum distance range a laser diode with a peak power of one Watt can be retrieved by a receiver component is approximately 27 meters in an undersea environment.

In the embodiments described herein an energy storing architecture capable of storing optical energy is used that is designed to be modulated with a low duty factor pulse train in order to generate a higher peak laser power without increasing average laser power. A characteristic of these types of storing laser architectures which are modulated to emit laser pulses, as opposed to conventional laser architectures, is that they can store significant amounts of energy optically during the "off" period between pulses. In some embodiments, the energy storing architecture includes an energy storing laser that can be modulated at very high frequencies (because of the short energy storage time) and an optical amplifier, for amplifying the energy storing laser pulse, that can store energy, thereby generating high peak power without increasing the average power. Thus, the peak power of a transmitted laser pulse is limited by the optical energy stored in the gain medium (e.g. a rare-earth doped fiber, which is pumped with a continuous wave power source such as a pump laser diode). That is, in storing lasers architectures, the electrical energy can be run constantly, and the energy storing architecture can store this energy optically until the energy storing architecture is instructed to transmit a pulse beam. The more time the energy storing laser is in the "off" period, the more optical energy that is stored in the laser. This increases the peak laser power of the laser pulse emitted by the energy storing laser during the "on" period without increasing the average laser power consumed during operation.

Also, in some embodiments, energy can be stored electrically and transmitted using a low duty factor pulse modulation. For example, an energy storing laser that can be driven at a very high current while delivering high optical output peak power can be used. In these embodiments, the laser peak power may not be a limiting factor. That is, a power supply capable delivering a plurality of pulses each of which having a pulse width that is less than half a time period between adjacent pulses can result in short bursts of high energy pulses that are directly converted to high electrical optical pulses without increasing average power consumption. Thus, the peak power of each pulse can be high (e.g. one or more orders of magnitude larger than the average power of the laser pulses) without significantly increasing the average power.

The ratio of peak power to average power depends on the pumping rate and the repetition rate between pulses. For example, if the pulse train is set to 1 GHz between pulses, there is at most 1 ns between pulses to store energy. Thus, the peak power is limited to how much energy can be pumped into the optical storage medium. As the amount of time between pulses is increased, the peak power and pulse energy will increase.

Figure 3A:
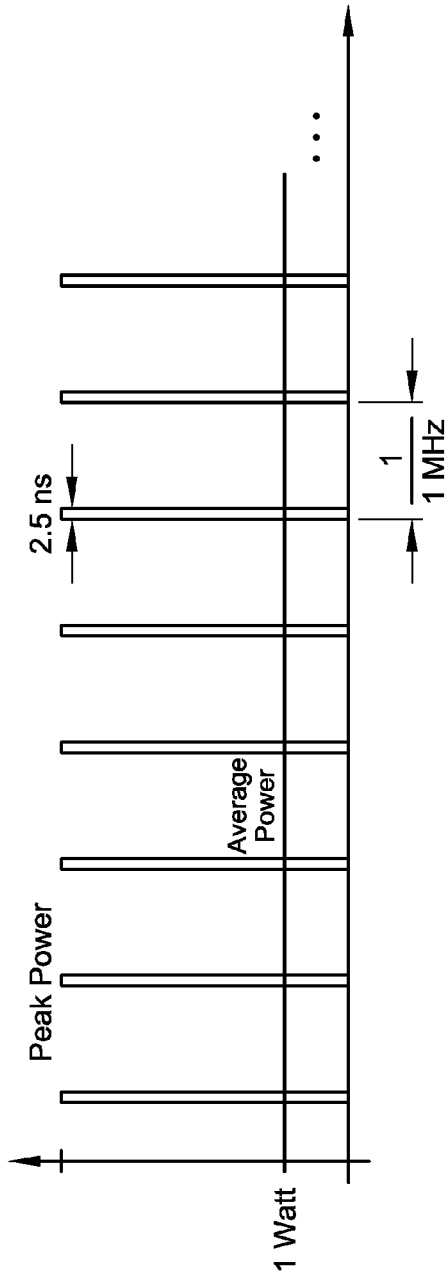
FIGS. 3A-3B are waveform diagrams of a one Watt pulsed fiber laser transmitting a communication signal using On/Off Key modulation.
Figure 3B:
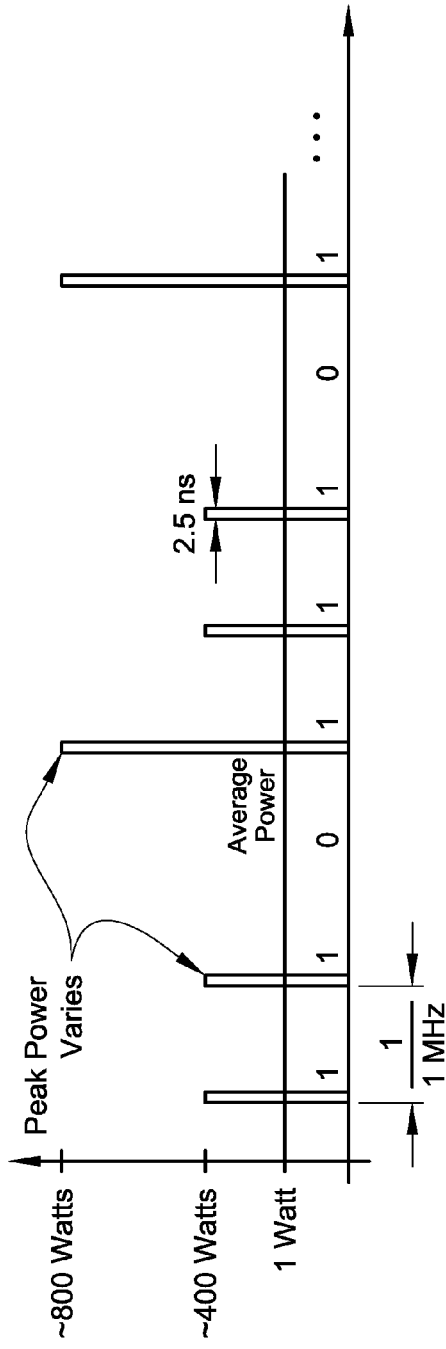

In some embodiments, the energy storing laser is a fiber laser or a fiber amplifier. In the embodiments of FIGS. 3A-3B, the pulse width of a fiber laser is set to approximately 2.5 ns. In other embodiments, other types of storing lasers may also be used that share this same energy storing characteristic including, for example, solid-state lasers such as a diode pump solid-state laser. The pulse width of a Q-switched diode pump solid-state laser can be as low as approximately 10 ns. For example, in one embodiment a frequency doubled, 1064 nm, Yb doped fiber laser operating at several Watts of average power and transmitting at approximately 520-570 nm light frequency (i.e. green light) can achieve a pulse width between 2-5 ns or shorter. Operating this fiber laser at 1 Mbps yields several kilo-Watts of peak power in an acute angle light beam.

Thus, the peak power of the energy storing laser can be increased by narrowing the pulse width (i.e. reducing the duty factor). With an increase in peak power the data transmission can be transmitted over larger distances, especially in the undersea environment where high attenuation and turbidity can significantly reduce the traveling distance of a transmitted signal. In some embodiments, the peak power can be one or more orders of magnitude larger than the average power.

FIGS. 3A and 3B provide examples of waveform diagrams of a one Watt pulsed fiber laser transmitting a communication signal, according to one embodiment. In FIGS. 3A and 3B, the pulse train is set at a 1 MHz frequency between pulses to send data at a rate of 1 Mbps with each pulse width narrowed to 2.5 ns. Thus, the "on" period for each pulse cycle is 2.5 ns and the "off" period for each pulse cycle is 997.5 ns. FIG. 3A shows a data transmission of a string of binary '1's (i.e. 11111111). In this example, the peak power of the one Watt pulsed fiber laser is 400 Watts and the average power consumed by the one Watt pulsed fiber laser for this data transmission is one Watt. The entire 1 watt of available power is utilized and peak power is optimized.

Figure 4:
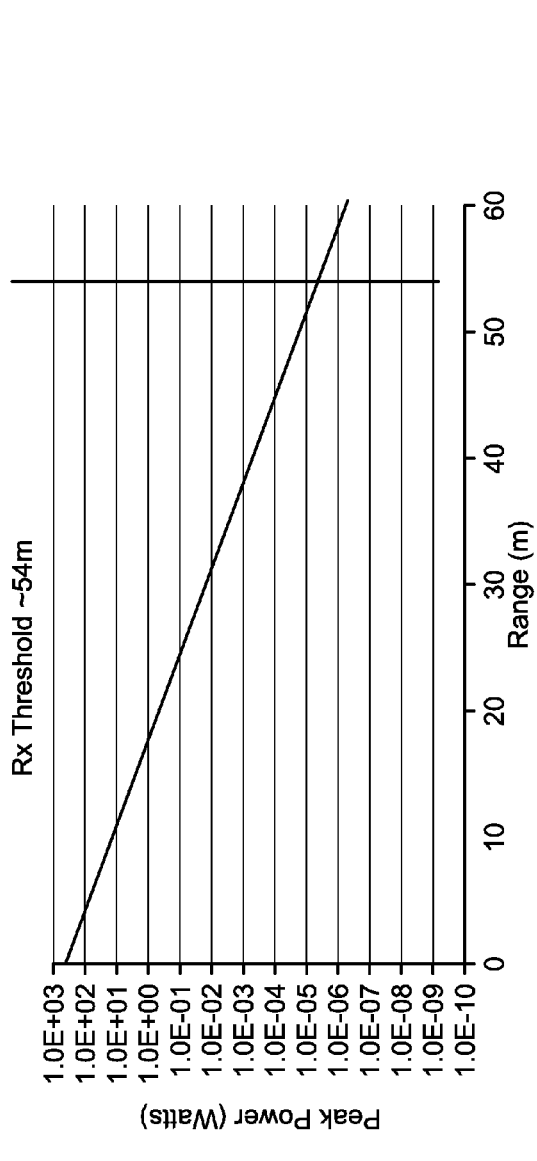
FIG. 4 is a graph showing a laser transmitter's peak power, employing a 1 Watt green pulsed fiber laser, as it is attenuated over range in a turbid undersea environment and the corresponding maximum that can be received by a typical receiver station.

FIG. 3B shows a data transmission with a mixture of binary '1's and '0's (i.e. 11011101). In this example, the peak power of the one Watt pulsed fiber laser varies based on the amount of time between laser pulses. Particularly, the peak power of the fiber laser is approximately inversely proportional to the amount of time between laser pulses. For example, when the amount of time between laser pulses is 997.5 ns, the peak power of the transmitted laser pulse is approximately 400 Watts. However, when the amount of time between laser pulses increases to 1,997.5 ns, the peak power of the transmitted laser pulse increases to approximately 800 Watts. The average power consumed by the one Watt pulsed fiber laser remains one Watt as the fiber laser is constantly converting and storing electrical energy into optical energy. As shown in FIG. 4, the maximum distance range a one Watt pulsed fiber laser with a peak power of approximately 400 Watts can be retrieved by a receiver component is approximately 54 meters in an undersea environment.

Figure 5:
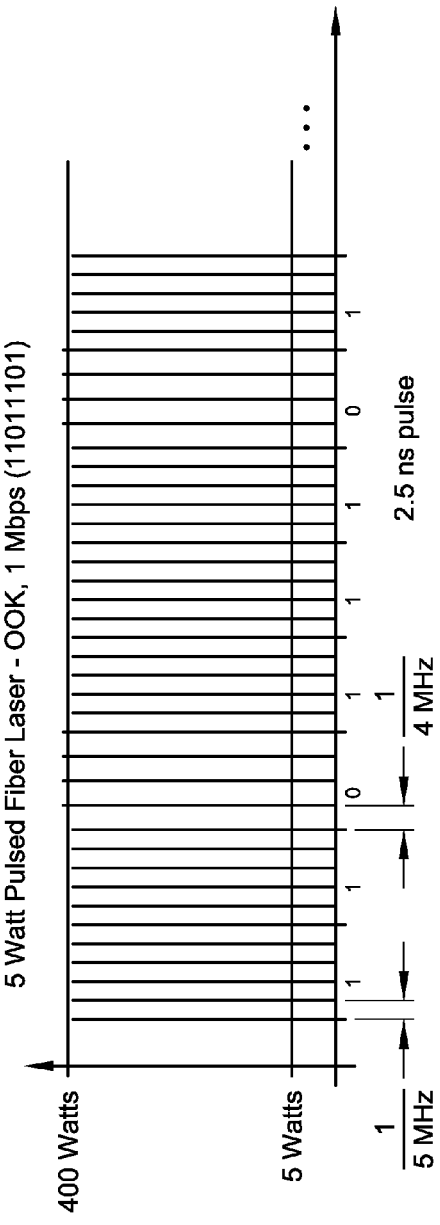
FIG. 5 is a waveform diagram of a five Watt pulsed fiber laser transmitting a communication signal using Binary Frequency Shift Key modulation.

FIG. 5 shows a waveform diagram of a five Watt pulsed fiber laser transmitting a communication signal using Binary Frequency Shift Key ("BFSK") modulation. As opposed to OOK modulation which uses amplitude to differentiate between '1' and '0' binary transmissions, BFSK modulates the frequency between pulses to differentiate between '1' and '0' binary transmissions. In this embodiment, the peak power of each pulse can remain around 400 Watts, while the average power consumed by the pulsed fiber laser remains at five Watts.

Figure 6:
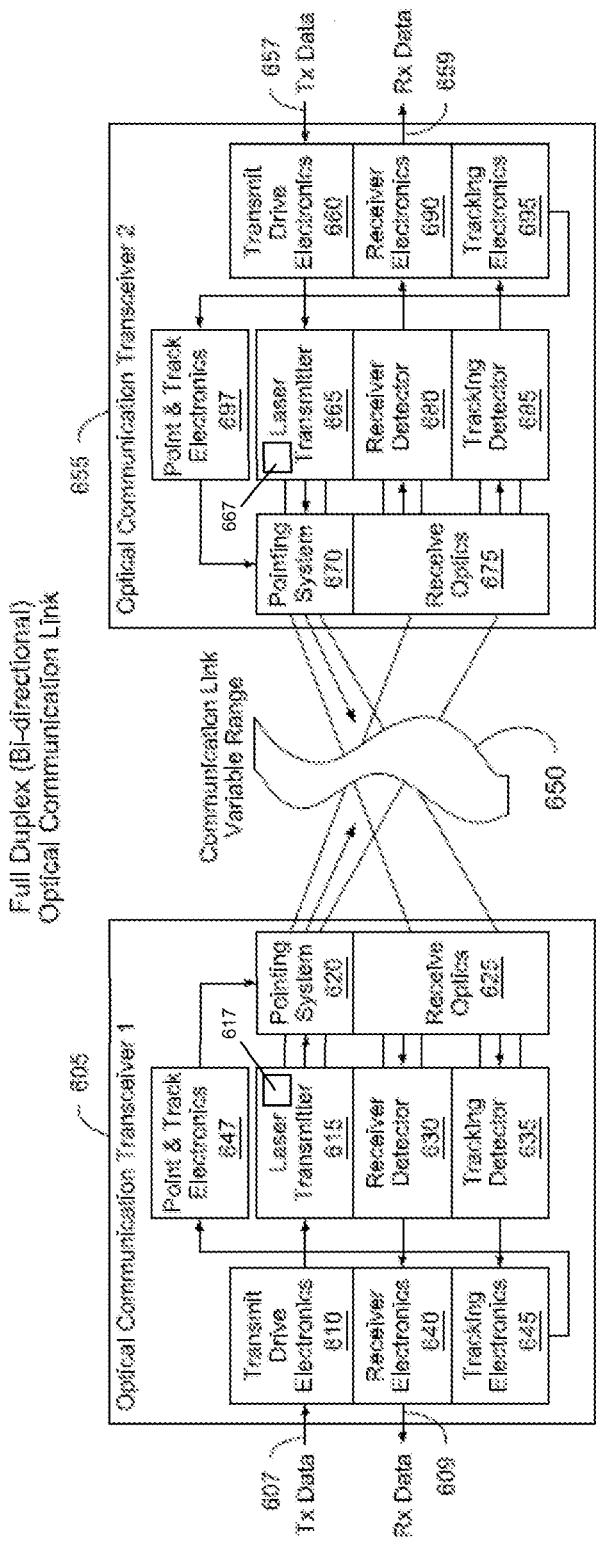
FIG. 6 is a block diagram of a communications system for transmitting and receiving data signals.

FIG. 6 is a block diagram of a communications system 600 for transmitting and receiving data signals according to one embodiment. The block diagram 600 includes a first optical communication transceiver 605 and a second optical communication transceiver 655. The first and second optical communication transceivers 605 and 630 can be one of a stationary platform, a moving vehicle, etc. Also, the first optical communication transceiver 605 and the second optical communication transceiver 655 can be used for a variety of communication applications, including an undersea communication application, a free space laser communication application, a space laser communication application, an atmospheric laser communication applications, etc.

The first optical communication transceiver 605 includes an input port 607 for inputting data from an external source to be transmitted by the first optical communication transceiver 605, and an output port 609 for outputting data received by the first optical communication transceiver 605 to an external source. The external source can be, for example, a control computer. Also, the input port 607 and the output port 609 are connected to the external source, for example, via an Ethernet cable. The first optical communication transceiver 605 includes a transmit drive electronics component 610 that converts the data to be sent from the transceiver 605 into a communication signal and sends the communication signal to a laser transmitter 615. The laser transmitter 615 creates a laser transmission signal embedded with the communication signal and with a pointing system 620 transmits the laser transmission to the second optical communication transceiver 655 via a communication link 650.

The first optical communication transceiver 605 also includes a receive optics component 625 that is capable of receiving laser transmissions from, for example, second optical communication transceiver 655 via the communication link 650. The receive optics component 625 sends the received laser transmission to a receiver detector 630 and a tracking detector 635. The receiver detector 630 separates the communication signal from the laser transmission and sends the communication signal to the receiver electronics component 645. The receiver electronics component 640 converts the communication signal into data that can then be transmitted to an external source via output port 609. The tracking detector 635 separates a feedback signal from the laser transmission and sends the feedback signal to a tracking electronics component 645. The tracking electronics component 645 uses the feedback signal to determine how the pointing system 620 and the receive optics component 625 needs to be repositioned. The tracking electronics component 645 then sends an instruction signal to the point & track electronics component 647. The electronic point & track electronics component 647 then repositions the pointing system 620 to correctly point to a receive optics component 675 of the second optical communication transceiver 655 and repositions the receive optics component 625 to correctly point to the pointing system 670 of the second optical communication transceiver 655.

The second optical communication transceiver 655 is similar in configuration to the first optical communication transceiver 605 and includes an input port 657, an output port 659, a transmit drive electronics component 660, a laser transmitter 665, the pointing system component 670, the receive optics component 675, a receive detector 680, a tracking detector 685, a receiver electronics component 690, a tracking electronics component 695 and a point & track electronics component 697.

The laser transmitters 615 and 665 include an energy storing architecture 617, 667, such as the energy storing architectures discussed above. The energy storing architecture 617, 667 can include an energy storing laser such as, for example, a pulsed fiber laser, a solid-state diode laser, etc. that is configured to output laser pulses having a peak power that is one or more orders of magnitude larger than an average power of the laser transmission. In some embodiments, the first and second optical communication transceivers 605 and 655 can include, for example, a fast detector, such as a Silicon avalanche photodiode or photo-multiplier tube or PIN diode, or any readily available off the shelf unit. In some embodiments, the laser transmitters 615 and 665 can also include a power supply for generating electrical energy. The power supply can be configured to generate a peak power electrical energy output for each of the plurality of laser pulses of a laser transmission. The peak power electrical energy is one or more orders of magnitude larger than an average electrical energy output for the laser transmission. The laser can be configured to convert the peak power electrical energy output directly into a peak power optical energy output for transmitting the laser transmission.

Also, in some embodiments, the first and second optical communication transceivers 605 and 655 include a laser light angle sensor that provides feedback for both the receiver orientation (i.e. tracking) and laser orientation (i.e. pointing). The light angle sensor uses a quadrant detector and/or a lateral effect photo-cell in combination with a lens. The pointing system components 620 and 670, and the receive optics components 625 and 675 are adjusted with gimbals and/or galvo mirrors. The light angle sensor can provide sufficient corrections in pointing and tracking orientation.

Systems for providing the point and tracking system between the first optical communication transceiver 605 and the second optical communication transceiver 655 can include, for example, fSONA's SONAbeam™ Free Space Optics system.

The invention claimed is:

1. A method for high bandwidth optical communication, comprising:
   establishing a communication link between a laser transmitter and a receiving unit, the laser transmitter including an energy storing architecture, and the energy storing architecture including an energy storing laser;
   converting data to be transmitted by the laser transmitter into a communication signal;
   incorporating the communication signal into a laser transmission that includes a plurality of laser pulses, each of the plurality of laser pulses having a pulse width less than half a time period between adjacent laser pulses of the laser transmission;
   transmitting the laser transmission;
   the energy storing architecture converting electrical energy into optical energy and storing the optical energy or the electrical energy generated between a transmission of adjacent laser pulses of the laser transmission;

the energy storing laser outputting a laser pulse having a peak power that is one or more orders of magnitude larger than an average power of the laser transmission;

receiving, via a receive optics component, a received laser transmission that includes a received communication signal and a received feedback signal;

separating, via a receiver detector, the received communication signal from the received laser transmission;

separating, via a tracking detector, the received feedback signal from the received laser transmission;

determining, via a tracking electronics component, repositioning information based on the received feedback signal; and repositioning, via a pointing system, the laser transmitter using the repositioning information such that the laser transmission is directed to a receiver unit.

2. The method of claim 1, further comprising storing the optical energy generated between the transmission of adjacent laser pulses in an optical amplifier of the energy storing architecture.

3. The method of claim 1, further comprising storing the optical energy generated between the transmission of adjacent laser pulses in a gain medium of the energy storing architecture.

4. The method of claim 1, further comprising amplifying the laser transmission to increase the peak power of each of the plurality of laser pulses without increasing an average power of the laser transmission.

5. The method of claim 1, further comprising a fiber laser of the energy storing architecture transmitting the laser transmission.

6. The method of claim 1, further comprising a solid-state laser of the energy storing architecture transmitting the laser transmission.

7. The method of claim 1, further comprising incorporating the communication signal into the laser transmission using On/Off Key modulation.

8. The method of claim 1, further comprising incorporating the communication signal into the laser transmission using Binary Frequency Shift Key modulation.

9. The method of claim 1, further comprising incorporating a power supply configured to generate a peak power electrical energy output for each of the plurality of laser pulses that is one or more orders of magnitude larger than an average electrical energy output for the laser transmission, each of the plurality of laser pulses having a pulse width less than half a time period between adjacent laser pulses of the laser transmission; and the energy storing architecture converting the peak power electrical energy output directly into a peak power optical energy output for transmitting the laser transmission.

10. The method of claim 1, further comprising:
transmitting the laser transmission in an undersea environment such that:
a frequency of the laser transmission is between 520-570 nm,
the laser transmission includes a plurality of laser pulses, with each of the plurality of laser pulses having a pulse width between 2-5 ns, and
the time period between the adjacent laser pulses of the plurality of laser pulses is 1000 ns.

11. A system for high bandwidth optical communication, comprising:
an optical communication device that includes:
a transmit drive electronics component configured to convert data to be sent from the optical communication device into a communication signal, and a laser transmitter configured to transmit a laser transmission that includes a plurality of laser pulses and incorporates the communication signal, the laser transmitter includes an energy storing architecture configured to convert electrical energy into optical energy and configured to store the optical energy or the electrical energy generated between a transmission of adjacent laser pulses of the laser transmission;

a receive optics component configured to receive a received laser transmission that includes a received communication signal and a feedback signal;

a receiver detector configured to separate the received communication signal from the received laser transmission;

a tracking detector configured to separate the feedback signal from the received laser transmission;

a tracking electronics component configured to determine repositioning information based on the feedback signal for repositioning the laser transmitter via the pointing system; and a pointing system configured to position the laser transmitter using the repositioning information such that the laser transmission is directed to a receiver unit;

wherein each of the plurality of laser pulses is configured to have a pulse width that is less than half a time period between adjacent laser pulses of the laser transmission, and wherein the energy storing architecture includes an energy storing laser programmed to output a laser pulse having a peak power that is one or more orders of magnitude larger than an average power of the laser transmission.

12. The system of claim 11, wherein the energy storing architecture includes an energy storing laser and an optical amplifier, the optical amplifier configured to store the optical energy generated between the transmission of adjacent laser pulses of the laser transmission.

13. The system of claim 11, wherein the energy storing architecture includes an energy storing laser and a gain medium, the gain medium configured to store the optical energy generated between the transmission of adjacent laser pulses of the laser transmission.

14. The system of claim 11, wherein the energy storing architecture is configured to amplify the laser transmission to increase the peak power of each of the plurality of laser pulses of the laser transmission without increasing the average power of the laser transmission.

15. The system of claim 11, wherein the energy storing architecture includes a fiber laser.

16. The system of claim 11, wherein the energy storing architecture includes a solid-state laser.

17. The system of claim 11, wherein the optical communication device is configured to incorporate the communication signal into the laser transmission using On/Off Key modulation.

18. The system of claim 11, wherein the optical communication device is configured to incorporate the communication signal into the laser transmission using Binary Frequency Shift Key modulation.

19. An optical communication device for high bandwidth optical communication comprising:
a transmit drive electronics component configured to convert data to be sent from the optical communication device into a communication signal;

a laser transmitter configured to transmit a laser transmission that includes a plurality of laser pulses and incorporates the communication signal, the laser transmitter includes an energy storing architecture configured to convert electrical energy into optical energy and configured to store the optical energy or the electrical energy generated between a transmission of adjacent laser pulses of the laser transmission;

a receive optics component configured to receive a received laser transmission that includes a received communication signal and a feedback signal;

a receiver detector configured to separate the received communication signal from the received laser transmission;

a tracking detector configured to separate the feedback signal from the received laser transmission;

a tracking electronics component configured to determine repositioning information based on the feedback signal for repositioning the laser transmitter via the pointing system; and a pointing system configured to position the laser transmitter using the repositioning information such that the laser transmission is directed to a receiver unit;

wherein each of the plurality of laser pulses is configured to have a pulse width that is less than half a time period between adjacent laser pulses of the laser transmission, and wherein the energy storing architecture includes an energy storing laser programmed to output a laser pulse having a peak power that is one or more orders of magnitude larger than an average power of the laser transmission.

* * * * *